United States Patent Office 3,031,290
Patented Apr. 24, 1962

3,031,290
DRY FORMULATIONS OF GIBBERELLIC ACID COMPOUNDS
Norman Senior, Alderley Park, Macclesfield, England, assignor to Imperial Chemical Industries Limited, Millbank, London, England, a corporation of Great Britain
No Drawing. Filed Jan. 19, 1959, Ser. No. 787,350
Claims priority, application Great Britain Feb. 7, 1958
5 Claims. (Cl. 71—2.4)

This invention relates to new compositions of matter and more particularly it relates to stable gibberellic acid compositions.

Gibberellic acid is a plant growth stimulant obtainable from the culture filtrates of certain active strains of the mould *Gibberella fujikuroi*. It may be applied in admixture with conventional diluents or carriers for example as an aqueous spray, as an alcoholic solution, as a paste with lanoline or as a powder. A disadvantage of such formulations however is associated with the relative lack of stability of gibberellic acid in the presence of water, which may lead to a short shelf life in such formulations. Thus it is known that gibberellic acid containing less than 0.1% of water may be stored for long periods in hermetically sealed containers without decomposition. Such conditions are not normally obtainable however in the commercial packing, storage and use of formulations containing gibberellic acid and/or the salts and esters thereof and there may even be appreciable quantities of water present in these compositions.

I have now found that it is possible to reduce the rate of decomposition of gibberellic acid and the salts and esters thereof when present in solid compositions by adding to the said compositions an anhydrous salt or other suitable dehydrating agent which will not react with gibberellic acid.

According to the invention therefore I provide solid compositions containing gibberellic acid and/or the salts or esters thereof wherein there is present an agent capable of removing small quantities of water thereby preventing or reducing the rate of decomposition of the said gibberellic acid and/or salts or esters thereof.

As suitable agents capable of removing water there may be mentioned for example anhydrous inorganic salts which readily absorb water and form the more stable hydrated states for example anhydrous sodium sulphate, magnesium sulphate and sodium carbonate. The following experiments illustrate the effectiveness of the said anhydrous salts in reducing the rate of decomposition of gibberellic acid.

One part by weight of gibberellic acid is admixed with 1000 parts of anhydrous salt (sodium carbonate, sodium sulphate or magnesium sulphate) and, under similar conditions, one part by weight of gibberellic acid is admixed with 1000 parts of the corresponding normally available hydrated salt (sodium carbonate decahydrate, sodium sulphate decahydrate or magnesium sulphate heptahydrate). The finely ground compositions so obtained are stored in air-dried glass containers which are then hermetically sealed to exclude moisture and are stored at 25° C. during 8 months. The gibberellic acid content of each composition is determined at the beginning and end of the storage period and the amount of decomposition found can be seen from the table below:

| Salt used (containing 0.1% of gibberellic acid) | Percentage decomposition of gibberellic acid | |
|---|---|---|
| | (a) In hydrated salt composition | (b) In anhydrous salt composition |
| Sodium carbonate | 7.7 | 3.3 |
| Sodium sulphate | 4.4 | 0.15 |
| Magnesium sulphate | 11.9 | 2.0 |

The experiments illustrate the beneficial effects obtained by the admixture of the anhydrous salts in place of the hydrated salts with gibberellic acid.

Other suitable agents which are capable of removing water and which may be used in the compositions of the present invention include for example inert or plant nutritive anhydrous salts which are capable of forming stable and non-deliquescent higher hydrates for example anhydrous copper sulphate and dried calcium sulphate, partially dehydrated salts of polybasic acids for example sodium and potassium pyrophosphates, metaphosphates and pyrosulphates and certain oxides provided that the hydrated products obtainable therefrom are innocuous. Other examples are alumina, calcium oxide and silica in its various forms such as silica gel.

The solid compositions of the invention may contain the agent capable of removing water as the sole diluent or carrier of the composition in admixture with gibberellic acid and/or the salts or esters thereof. Alternatively two or more such agents may be present and there may optionally be present other diluents or carriers which are generally used in the formulation of plant-growth compositions and especially compositions used to apply gibberellic acid.

Suitable additional carriers or diluents may be for example those generally used as fertilisers in horticulture and in agriculture for example phosphates, sulphates and nitrates of sodium, potassium, ammonia and calcium. Other solid diluents or carriers may be organic compounds such as urea or earths and clays or other innocuous products for example china clay, diatomite, kaolin, bentonite and kieselguhr. Commercial grades of such diluents or carriers contain water in varying concentrations or they may absorb water from the atmosphere during the process of admixture in preparing compositions or during storage of such compositions. When however an agent capable of removing water such as has been described above is present in these solid compositions, the gibberellic acid is protected to a certain extent and its rate of decomposition is considerably reduced.

The solid compositions of the invention may also be formulated in the form of ointments wherein the gibberellic acid is distributed throughout a fatty medium for example anhydrous lanoline (wool fat). Commercial wool fat or so-called anhydrous lanoline generally contains small amounts of water and when used to formulate gibberellic acid compositions the compositions so obtained are liable to decompose on protracted storage. The addition of an agent capable of removing such water improves the storage properties of such compositions.

The proportion of anhydrous salt or other agent capable of removing water needed to adequately protect the gibberellic acid compositions from decomposition is governed by the nature of the diluents or carriers present in the compositions and the initial moisture content and the type of container used for such compositions. In general, at least 5% of the said agent is necessary and preferably about 15–30% the agent is present in the compositions.

The invention is illustrated but not limited by the following examples in which the parts are by weight:

*Example 1*

One part of gibberellic acid is ground with 10 parts of anhydrous sodium sulphate until a uniform powder is obtained. Sufficient anhydrous sodium sulphate is then added with mixing to yield 100 parts of composition. The preparation thus obtained is suitable for agricultural and horticultural purposes and may be stored in well-closed containers without risk of serious loss of activity of the gibberellic acid.

*Example 2*

One part of potassium gibberellate is ground with 10 parts of anhydrous sodium sulphate until a uniform powder is obtained. Sufficient anhydrous sodium sulphate is added with mixing to yield 500 parts of composition which is immediately stored in well-closed containers until required for use. The product is suitable for agricultural and horticultural purposes without risk of serious loss of activity of the potassim gibberellate.

*Example 3*

One part of gibberellic acid is ground with 10 parts of potassium phosphate until a uniform powder is obtained. Further quantities of potassium phosphate are added with grinding and mixing until 425 parts of the mixture have been formed. To this is added 75 parts of anhydrous magnesium sulphate and the mixture is ground until of uniform composition. It is immediately transferred to well-closed containers until required for use and there is no risk of serious loss of activity of the gibberellic acid.

*Example 4*

One part of gibberellic acid is ground with 10 parts of ammonium sulphate until a uniform powder is obtained. Further quantities of ammonium sulphate are added with grinding and mixing until a total of 1500 parts are present. To this mixture is added sufficient anhydrous sodium sulphate with stirring until 2000 parts of the composition have been obtained. It is immediately transferred to well-closed containers until required for use and there is no substantial risk of serious loss of activity of the gibberellic acid.

*Example 5*

One part of gibberellic acid is ground with 10 parts of anhydrous sodium sulphate until a uniform powder is obtained. Further quantities of anhydrous sodium sulphate are added with grinding and mixing until 750 parts have been added. 500 parts of anhydrous magnesium sulphate are then added with mixing. Sufficient urea (moisture content not above 0.1%) is then added with mixing to produce 5000 parts. The mixture is immediately transferred to well-closed containers until required for use and there is thus no substantial risk of serious loss of activity of the gibberellic acid.

*Example 6*

One part of gibberellic acid is ground with 10 parts of potassium pyrophosphate until a uniform powder is obtained. A further 40 parts of potassium pyrophosphate are added and mixing is continued. 40 parts of calcium phosphate are then added and stirring is continued until a uniform powder is obtained. The mixture is immediately transferred to well-closed containers until required for use and there is thus no substantial risk of serious loss of activity of the gibberellic acid.

*Example 7*

One part of gibberellic acid is ground with 5 parts of dried powdered silica gel until a uniform powder is produced. A further 25 parts of the silica gel powder are added and mixed. 70 parts of diatomite are then added and mixing is continued until a uniform powder is obtained. The mixture is immediately transferred to well-closed containers until required for use and there is thus no substantial risk of serious loss of activity of the gibberellic acid.

*Example 8*

One part of gibberellic acid is ground with 20 parts of potassium phosphate until a uniform powder is obtained. Further potassium phosphate is then added to produce 1500 parts of mixture. 500 parts of powdered quicklime are then added and mixed. The bulk is adjusted to 10,000 parts by the addition of calcium phosphate and mixing is continued until a uniform composition is obtained. The mixture is immediately transferred to well-closed containers until required for use and there is thus no substantial risk of serious loss of activity of the gibberellic acid.

*Example 9*

To a warm mixture of 89 parts of wool fat and 5 parts of calcium sulphate hemihydrate at 60° C. there is added a hot solution of one part of gibberellic acid in 5 parts of industrial methylated spirit and the mixture is stirred with cooling until a uniform paste is obtained. The mixture is transferred to a well-closed container and there is thus no substantial risk of serious loss of activity of the gibberellic acid.

*Example 10*

To admixture of 84 parts of wool fat and 10 parts of dried silica gel (in fine powder) at 60° C. is added a hot solution of one part of gibberellic acid in 5 parts of industrial methylated spirit and the mixture is stirred with cooling until a uniform paste is obtained. The mixture is transferred to a well-closed container and there is thus no substantial risk of serious loss of activity of the gibberellic acid.

What I claim is:

1. A dry composition comprising a gibberellic acid compound in amount sufficient to stimulate plant growth, and at least 5% by total weight of a dehydrating agent selected from the group consisting of anhydrous sodium sulphate, anhydrous magnesium sulphate, anhydrous sodium carbonate, anhydrous copper sulphate, dried calcium sulphate, partially dehydrated sodium pyrophosphate, partially dehydrated potassium pyrophosphate, partially dehydrated sodium metaphosphate, partially dehydrated potassium metaphosphate, partially dehydrated sodium pyrosulphate, partially dehydrated potassium pyrosulphate, alumina and silica gel.

2. A composition as claimed in claim 1 including a fertilizer selected from the group consisting of sodium phosphate, potassium phosphate, ammonium phosphate, calcium phosphate, sodium sulphate, potassium sulphate, ammonium sulphate, calcium sulphate, sodium nitrate, potassium nitrate, ammonium nitrate, and calcium nitrate.

3. A composition as claimed in claim 1 and including urea.

4. A composition as claimed in claim 1 and including a compound selected from the group consisting of china clay, diatomite, kaolin, bentonite and kieselguhr.

5. A composition as claimed in claim 1 wherein said gibberellic acid compounds are distributed throughout a fatty medium consisting of anhydrous lanoline.

References Cited in the file of this patent

UNITED STATES PATENTS

| | | |
|---|---|---|
| 2,842,051 | Brian et al. | July 8, 1958 |
| 2,918,413 | Redemann | Dec. 27, 1959 |
| 2,921,410 | Merritt | Jan. 19, 1960 |

FOREIGN PATENTS

| | | |
|---|---|---|
| 123,579 | Australia | Feb. 12, 1947 |

OTHER REFERENCES

Leben: "Science," vol. 125, March 1957, pages 494–495.

Barton: "Contr. Boyce Thompson Institute," vol. 18, No. 8, July–September 1956, pages 311–316.